United States Patent [19]

Hillman et al.

[11] 3,979,174

[45] Sept. 7, 1976

[54] ARTICLE TRIMMING APPARATUS

[75] Inventors: Thomas F. Hillman, Bath; Arthur H. Pienkoski, Painted Post, both of N.Y.

[73] Assignee: Corning Glass Works, Corning, N.Y.

[22] Filed: Oct. 24, 1975

[21] Appl. No.: 625,644

[52] U.S. Cl............................. 425/292; 72/453.14; 83/552; 425/451.9
[51] Int. Cl.²...................... B29C 3/00; B29C 17/08
[58] Field of Search................... 83/552, 564, 859; 72/453; 425/292, 388, 806, DIG. 48, 167, 450.1, 451.9, 451.2, DIG. 223

[56] References Cited
UNITED STATES PATENTS

| | | | |
|---|---|---|---|
| 1,970,134 | 8/1934 | Ferris | 72/453 |
| 3,145,824 | 8/1964 | Giffin | 198/27 |
| 3,596,499 | 8/1971 | Sauerbrey | 72/453 X |
| 3,707,866 | 1/1973 | Brauer | 72/453 |
| 3,918,871 | 11/1975 | Anderson | 425/292 |

*Primary Examiner*—J. Howard Flint, Jr.
*Assistant Examiner*—Carl Rowold
*Attorney, Agent, or Firm*—Charles W. Gregg; Burton R. Turner; Clarence R. Patty, Jr.

[57] ABSTRACT

A modification to an apparatus for trimming thermoplastic material surrounding the bordering edge of an article formed in a die or mold from a sheet of pliable thermoplastic material such as glass arranged over the die or mold which is supported by a mold or die carrier, such apparatus including a trimmer having a lower cutting edge and disposed above the die with the center of the trimmer in vertical axial alignment with the center of the die and cooperative with a trimming edge of the die when the trimmer is lowered for trimming of the article formed in the die. A pressurized hydraulic fluid cylinder vertically actuates the trimmer. The modification comprises apparatus for assuring horizontal alignment of the cutting and trimming edges when trimming operations are performed thereby and such apparatus includes a pair of anvils which are supported by a pair of support arms which also support said cylinder and associated apparatus, a pair of hydraulic fluid cylinders which actuate the support arms upwardly and the anvils into contact with the die carrier, and a pair of hydraulic fluid pressure intensifiers or intensification devices, hydraulic fluid conduits, pressure relief valves and a pressure accumulator providing a hydraulic pressurized fluid intensification system for intensifying the pressure of the hydraulic fluid supplied to the pair of hydraulic fluid cylinders when the piston of the first mentioned cylinder moves downwardly and actuates the pressure intensifiers or intensification devices.

5 Claims, 5 Drawing Figures

3,979,174

ARTICLE TRIMMING APPARATUS

BACKGROUND OF THE INVENTION

There is disclosed, for example, in each of one or more of U.S. Pat. Nos. 3,193,367 and 3,582,454, and copending U.S. application Ser. No. 526,137 now U.S. Pat. No. 3,918,871, filed Nov. 22, 1974 and assigned to the same assignee as the present application, apparatuses for and a method of trimming thermoplastic material surrounding the bordering edge of an article formed in a die or mold from a sheet of pliable thermoplastic material, such as glass for example, arranged over the die or mold. When such a method and/or apparatus is employed in conjunction with an apparatus or conveyor similar to that shown in U.S. Pat. No. 3,145,824, for example, that is, in an apparatus in which each of a plurality or succession of dies or molds are successively or intermittently indexed or positioned at an article trimming station provided in an apparatus such as exemplified by said Pat. No. 3,145,824, the dies or molds so successively or intermittently indexed or positioned are oftentimes not precisely horizontally aligned with the trimming apparatus or trimmer provided or employed at said trimming station for the aforesaid trimming purposes. It is, accordingly, an object of the present invention to provide article trimming apparatus of the class described and including means for assuring, to the extent possible, horizontal alignment between the cutting and trimming edges of the dies or molds and the trimmer device of the trimming apparatus during a trimming operation.

It is another object of the present invention to provide a trimming apparatus of the type mentioned and, by the use of which, more acceptable and rapid thermoplastic material trimming operations may be performed.

Other objects and characteristic features of the invention will become apparent as the description proceeds.

SUMMARY OF THE INVENTION

The invention is believed to be adequately summarized in the foregoing abstract of the disclosure and, therefore, in order to prevent repetition or redundancy to the extent possible, no further summary of the invention will be given nor is any believed to be necessary.

BRIEF DESCRIPTION OF THE DRAWINGS

In the Drawings.

Similar reference characters refer to similar parts in each of the Figs. of the drawings.

PREFERRED EMBODIMENTS OF THE INVENTION

Figure 1:
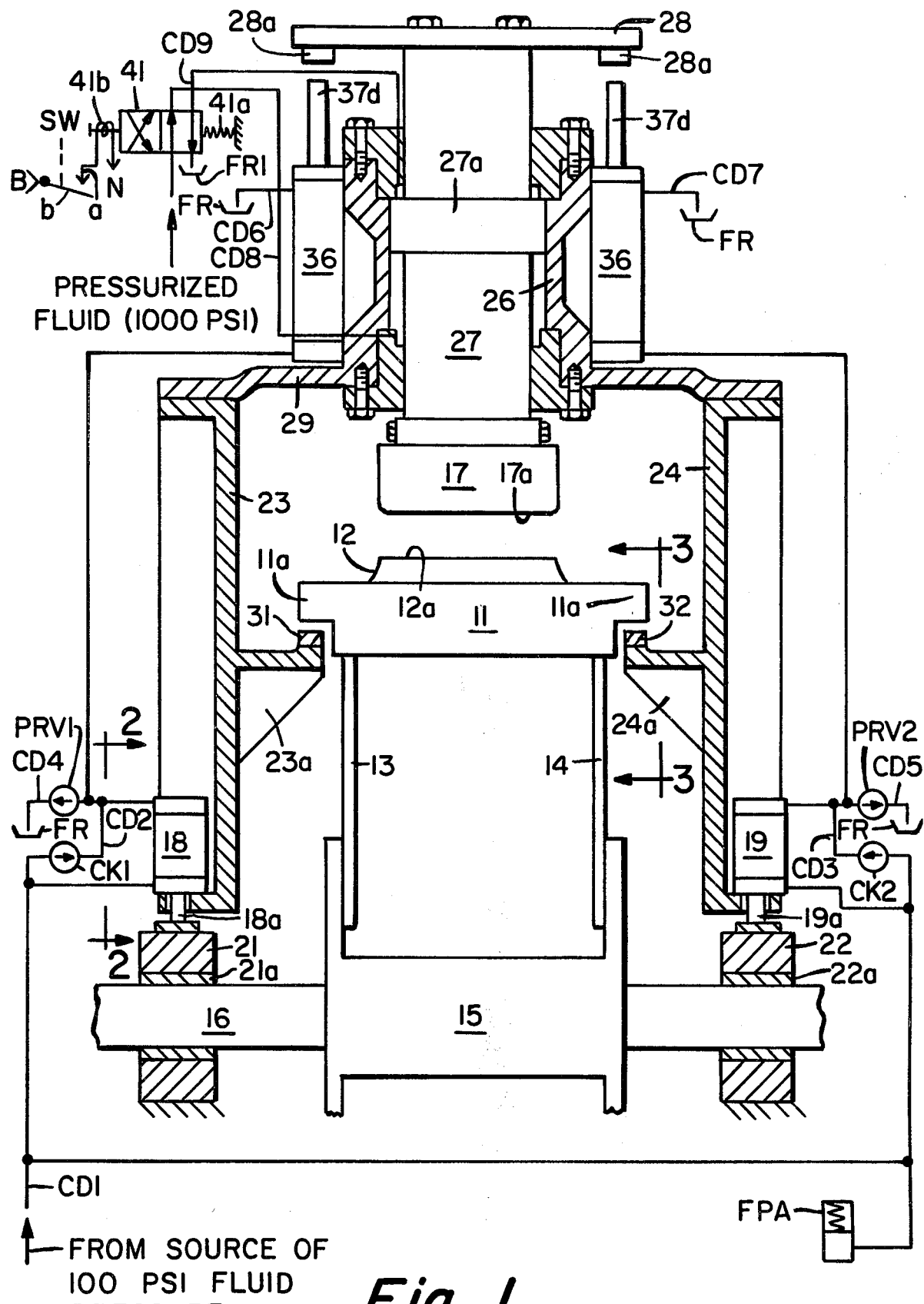
FIG. 1 is an elevational view, substantially in cross section, illustrating apparatus embodying the invention, such view also schematically illustrating pressurized hydraulic fluid conduits and associated devices of a pressure intensification system or apparatus employed in the invention.

Referring to the drawings in detail, there is shown in FIG. 1 a mold or die carrier 11 which is one of a plurality of such carriers each of which is intermittently or successively indexed to or positioned at an article trimming station to correspondingly index or position each of a plurality of associated molds or dies such as 12 to such station. As previously mentioned, the carriers such as 11 and their supported dies or molds such as 12 may, as an example only, be successively indexed to said trimming station by an apparatus or conveyor similar to that shown in said Pat. No. 3,145,824, each carrier such as 11 being supported on the upper ends of one pair of a plurality of pairs of carrier supports such as 13 and 14 which extend upwardly when the supported carrier and its associated die or mold are moved by the respective supports to the aforesaid trimming station. The lower ends of the supports such as 13 and 14 are secured to a hub 15 of a horizontally extending axle or shaft 16 which intermittently rotates such hub for the intermittent indexing or positioning of each of a succession of carriers such as 11 and its respectively carried die or mold such as 12 to the trimming station. Each mold or die such as 12 includes a trimming edge such as 12a which is cooperative with the cutting edge 17a of a depending trimmer 17 for thermoplastic trimming operations similar to those discussed in the aforesaid Pat. Nos. 3,193,367 or 3,582,454 or the aforesaid copending application Ser. No. 526,137 now U.S. Pat. No. 3,918,871.

Figure 2:
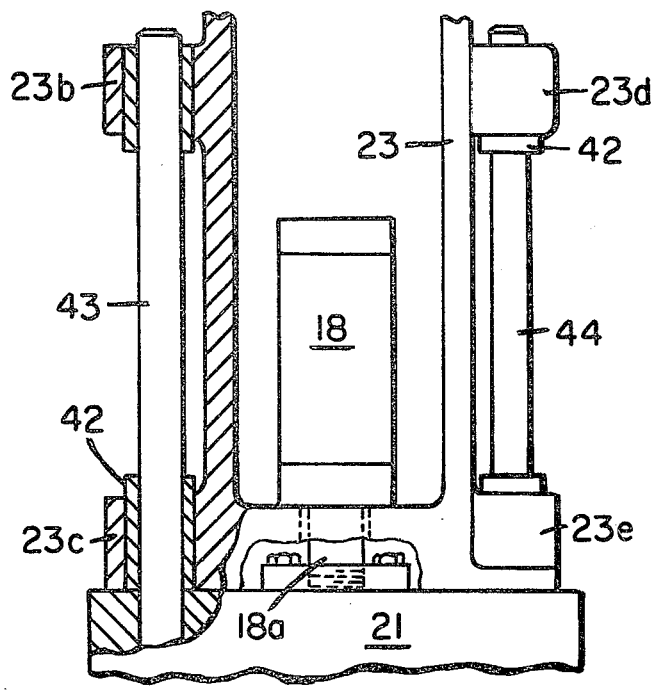
FIG. 2 is an elevational view of part of the apparatus of FIG. 1, such view being taken generally along line 2—2 of FIG. 1.

Referring further to FIG. 1 taken in conjunction with FIG. 2, the otherwise free ends of piston rods 18a and 19a of relatively small similar first and second pressurized hydraulic fluid cylinders 18 and 19, respectively, are secured, as best illustrated in FIG. 2, to a pair of pillow blocks 21 and 22, respectively, embodying bushings 21a and 22a, respectively, through which the aforesaid axle or shaft 16 extends for rotation therein. Said cylinders 18 and 19 are secured to the lower ends of first and second upwardly extending support arms 23 and 24 which support on their upper ends a relatively large pressurized hydraulic fluid cylinder 26 embodying a piston 27 which extends out of the ends of the cylinder 26, such cylinder being supported on the upper ends of arms 23 and 24 by a cross member 29 affixed to and extending between such upper ends. The aforesaid trimmer 17 is attached to the lower end of said piston 27 and there is secured to the upper end of such piston a cross member or rod actuator 28 to be hereinafter discussed. Referring to FIG. 2, support arm 23 is provided on each of the front and back sides thereof (viewing FIG. 1) with a pair of upper and lower laterally extending bosses such as 23b and 23c, and 23d and 23e, respectively, each of which embodies a bushing such as 42 which snugly and slidably surround suitable guide shafts 43 and 44, with the bushings such as 42 in bosses 23b and 23c surrounding guide shaft 43 and the bushings such as 42 in bosses 23c and 23d surrounding guide shaft 44. The lower ends of shafts 43 and 44 are firmly supported in pillow block 21 and such shafts stabilize and guide support arm 23 when it is actuated upwardly by cylinder 18 and its associated piston rod 18a. It will be understood that a similar stabilizing and guide arrangement is provided for support arm 24 but, for purposes of simplification of the drawings by avoidance of duplication of any Figs. thereof, said similar stabilizing and guide arrangement is not shown.

Figure 3:
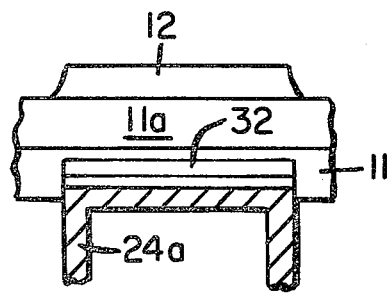
FIG. 3 is an elevational view of a part of the apparatus of FIG. 1, such view being partially in cross section and taken generally along line 3—3 of FIG. 1.

A pair of first and second anvils 31 and 32 are affixed to or carried by laterally extending support members 23a and 24a, respectively, which extend from the facing sides of the aforesaid support arms 23 and 24, respectively, the upper surfaces or faces of said anvils facing, in relatively close proximity thereto, the under side or surface of an overhang such as 11a of the aforesaid mold or die carrier 11. (See also FIG. 3). Such an overhang may be annular in shape, extending about the die carrier 11 or, as shown in FIG. 1, it may comprise a pair of shoulders whose under sides or surfaces extend over said upper surfaces or faces of anvils 31 and 32 in close proximity thereto. Said upper surfaces or faces of anvils 31 and 32 contact the under surface or surfaces of the overhang or shoulders such as 11a when cylinders 18 and 19 actuate support arms 23 and 24 upwardly as hereinafter further discussed.

Figure 4:
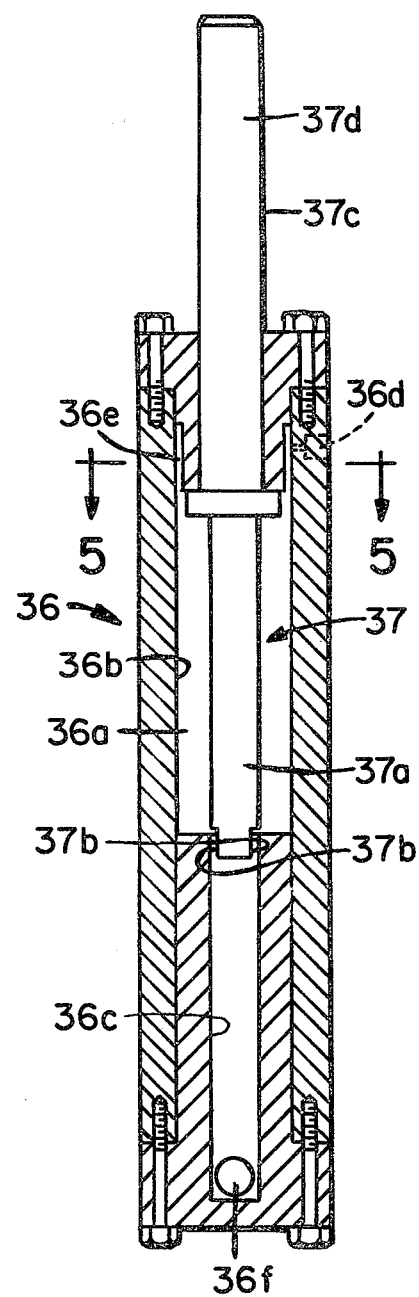
FIG. 4 is a cross-sectional view of a fluid pressure intensifier or intensification cylinder employed in the apparatus disclosed.
Figure 5:
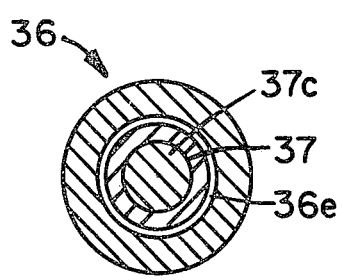
FIG. 5 is a cross-sectional view of the cylinder of FIG. 4, such view being taken generally along line 5—5 of FIG. 4.

A pair of similar first and second hydraulic fluid pressure intensifiers or intensification cylinders such as 36 are attached in any convenient manner to each of diametrically opposite sides of hydraulic cylinder 26 above the aforesaid cross member 29 and with the centerline of the bore of each cylinder such as 36 paralleling the centerline of the bore of cylinder 26. As shown in FIG. 4, approximately the upper half 36b of the bore 36a of each cylinder such as 36 has a relatively large diameter with the remainder or lower part 36c of such bore having a smaller diameter than said upper half of bore 36. A rod 37 is embodied in bore 36a of cylinder 36 and includes a lower portion 37a which forms an elongate piston which fits snugly and slidably in said lower part 36c of bore 36a, that is, is snugly and slidably axially movable in lower part 36c of bore 36a of cylinder 36. Such elongate piston, that is, the lower end of portion 37a of rod 37 embodies a fluid passage or passages which provide for fluid flow between said smaller portion 36c of bore 36a of cylinder 36 and said upper portion 36b of such bore only when the lower end of said elongate piston or portion 37a of rod 37 is adjacent the upper end of said smaller bore portion 36c. Such fluid passage or passages are shown embodied in said lower end of portion 37a of rod 37 by one or more so-called flats or flat portions such as 37b provided on the periphery of portion 37a adjacent the lower end thereof and extending to such lower end. Each rod such as 37 also includes an upper portion such as 37c having an upper end 37d extending snugly and slidably through the upper end of the respective intensifier or intensification cylinder such as 36 for physical contact, at times, of the top of such upper end by the lower face of a suitable hardened contact member such as 28a supported on the bottom surface of member or rod actuator 28, each such contact member facing said top of the upper end 37d of said upper portion 37c of each rod such as 37. Adjacent the upper end of upper portion 36b of bore 36a of each cylinder such as 36, there is provided a fluid flow passage such as 36d which extends through the wall of each respective cylinder 36 to the exterior of such cylinder, the inner end of each such passage connecting with a relatively small diameter orifice which, in turn, connects with a fluid flow passage such as 36e which connects with said upper end of upper portion 36b of bore 36a of each respective cylinder such as 36. (See also FIG. 5).

As shown in FIG. 1, a first fluid flow conduit CD1 connects a source of hydraulic fluid at a relatively low pressure, such as 100 psi. for example, in multiple to the lower ends of the bores of cylinders 18 and 19, to the inlet sides of first and second fluid flow check valves CK1 and CK2, to be discussed, and to the inlet of a mechanical fluid pressure accumulator FPA also to be discussed. A second fluid flow conduit connects the outlet side of said first check valve CK1 in multiple to the upper end of the bore of cylinder 18, to the inlet side of a first fluid pressure release valve PRV1, to be discussed, and to a fluid passage such as 36f (FIG. 4) connecting with the lower end of the bore of the intensifier or intensification cylinder such as 36 attached to the left hand side of cylinder 26 (viewing FIG. 1 of the drawings). A third fluid flow conduit connects the outlet side of said second check valve CK2 in multiple to the upper end of the bore of cylinder 19, to the inlet side of a second pressure relief valve PRV2, to be discussed, and to the lower end of the bore of the intensifier or intensification cylinder such as 36 attached to the right hand side of cylinder 26 (viewing FIG. 1). Fourth and fifth fluid flow conduits connect the outlet ends of said pressure relief valves PRV1 and PRV2, respectively, to a fluid reservoir FR, while sixth and seventh fluid flow conduits CD6 and CD7 connect the passages such as 36d (FIG. 4) in the upper ends of the bores of said intensification or intensifier cylinders such as 36 to said fluid reservoir FR. It is expedient to here point out that the aforesaid source of hydraulic fluid is not shown in the drawings, for purposes of simplification thereof, and that said reservoir FR is a fluid reservoir for such source.

As also shown in FIG. 1, a pressurized hydraulic fluid flow control valve 41 is provided, such valve being an electrical solenoid actuated valve which is normally biased to a first position by a compressible spring 41a and is actuated to a second position by the energization of the solenoid winding 41b of such valve. Winding 41b is shown as having an energizing circuit which extends from a positive terminal B of a source of direct current suitable for energization of such winding and thence over contacts a-b of an electric switch SW, in the circuit closed condition of the switch, and through solenoid winding 41b to a negative terminal N of said current source. Said direct current source is not shown in the drawings, for purposes of simplification thereof, but such source may, for example, be a battery of a voltage and capacity suitable for the energization of winding 41b of valve 41. Switch SW may, for example, be actuated by a timing drum such as is well known in the art. Valve 41 may be located at any convenient location and such valve selectively controls, as hereinafter discussed, a flow of hydraulic fluid at a pressure of 1000 psi., for example, to and from the upper and lower ends of the bore of cylinder 26 for actuation of said piston 27. For purposes of simplification of the drawings, the source of said hydraulic fluid at a pressure of 1000 psi. is also omitted from the drawings.

The apparatus of the invention having been described in detail, a brief operational example of the invention will now be set forth.

It will be assumed that the aforesaid sources of pressurized hydraulic fluid are activated and, therefore, that the apparatus of the invention is initially in the conditions shown in FIG. 1, that is, hydraulic fluid at a pressure of 1000 psi., for example, flows through flow control valve 41 to a fluid flow conduit CD8 and through such conduit to the lower end of the bore of cylinder 26 to press against the lower annular surface of portion 27a of piston 27 and raise such piston to its position shown in FIG. 1. At this time, the upper end of the bore of cylinder 26 is connected through a fluid flow conduit CD9 and fluid flow control valve 41 to a fluid reservoir FR1 for said 1000 psi. pressurized hydraulic fluid.

The hydraulic fluid pressure at a pressure of 100 psi. at this time flows through fluid conduit CD1 to pressure accumulator FPA, and to the lower ends of the bores of cylinders 18 and 19, and also through check valves CK1 and CK2 to fluid flow conduits CD2 and CD3, respectively, to the inlet sides of pressure relief PRV1 and PRV2, respectively. Such pressurized hydraulic fluid also flows, at such time, from conduit CD2 to the upper end of the bore of cylinder 18 and to the lower end of the bore of the left hand pressure intensifier or intensification cylinder 36, and from conduit CD3 to the upper end of the bore of cylinder 19 and to the lower end of the bore of the right hand pressure intensifier or intensification cylinder 36. Thus, the pressurized fluid supplied to both ends of each of the cylinders 18 and 19 is at the same pressure at such time. Piston rods 18a and 19a of such cylinders remain retracted, at such time, within their respective cylinders 18 and 19 due to the substantially heavy weight of the apparatus to be lifted by such cylinders and piston rods although there is a difference in the force of the pressure on the upper face of each of the pistons in cylinders 18 and 19 and the force of the pressure on the lower face of each of such pistons, such differential force being due to such upper faces having larger areas than the areas of the lower faces of such pistons because the ends of piston rods 18a and 19a take up small areas which would otherwise be part of such lower faces of the pistons. Said differential force is, of course, insufficient to overcome the weight of the apparatus as mentioned above. This will be readily apparent to those skilled in the art. Support arms 23 and 24 and anvils 31 and 32, as well as the remainder of the apparatus to be lifted by such cylinders and piston rods, are, therefore, in their lowered positions shown in FIG. 1.

It is believed expedient to here point out that the hydraulic fluid flow system, including conduits CD1 through CD5, fluid reservoir FR, the bores of cylinders 18 and 19, and the intensification or intensifier cylinders such as 36, and the interiors of the valves CK1, CK2, PRV1 and PRV2 and of pressure accumulator FPA, as well as the pump or similar device that pressurizes the hydraulic fluid in such system, is completely filled with the hydraulic fluid at all times. It is also expedient to here point out that the pressure relief valves PRV1 and PRV2 are set, for example, to relieve hydraulic fluid pressure at 100 to 200 psi. pressure above the pressure required for lifting of the apparatus as mentioned above and, therefore, there is no fluid flow through such valves at this time. The pressurized hydraulic fluid being supplied to the lower ends of the bores of the cylinders such as 36 at this time presses against the bottoms of the lower ends of the lower portions or pistons such as 37a of the rods such as 37 in the intensifier or intensification cylinders such as 36, and such fluid actuates rods 37 upwardly in their respective cylinders such as 36 and the upper ends 37d of upper portions 37c of the rods 37 out of the upper ends of the respective cylinders such as 36 as shown in FIGS. 1 and 4. When the rods such as 37 reach the upper limits of their strokes as shown in FIGS. 1 and 4, the pressurized fluid supplied to the lower ends of the bores of the respective cylinders such as 36 flows past the previously mentioned so-called flats such as 37d on the sides of the lower ends of rods 37 and into the large bore portions such as 36a of the bores of the respective cylinders, to displace the fluid then in such bores and cause it to flow through the passages such as 36f (FIGS. 4 and 5) at the upper ends of the bores of the respective cylinders and through the aforesaid small orifice or passage (approximately 0.050 inches in diameter) in the wall of each respective cylinder to the aforesaid passage such as 36d in each cylinder and thence to fluid reservoir FR (FIG. 1).

For the purposes of further setting forth an operational example of the invention, it will be assumed, as an example only, that the inner diameter of the bores of cylinders 18 and 19 is 2 inches, that the diameter of the piston rods 18a and 19a, respectively, of such cylinders is 1 inch, that the diameter of the piston or lower portions 37a of the rods 37 of the intensifier or intensification cylinders such as 36 is one half inch, and that the weight of support arms 23 and 24 and the apparatus supported thereby, is 1400 lbs. Under such conditions, with said 100 psi. hydraulic fluid pressure being supplied to the system as previously assumed, the net upward force being exerted by each of the cylinders 18 and 19 is 100 × the area of the cross-section of each of the piston rods 18a and 19a or $100 \times 3.1416 \times \frac{1}{2}^2$ or 78.64 pounds when the pressure intensifiers are not actuated. Since the weight to be lifted by each cylinder such as 18 and 19 is 700 lbs. (one half of 1400 pounds) then, in order to lift such weight, each pressure intensifier such as 36 must supply pressurized hydraulic fluid at a pressure of approximately 197.82 psi. to the respectively associated cylinders 18 and 19, that is, 700 pounds—78.64 pounds divided by 3.1416 ($3.1416 \times 1^2$ which is the area of the upper face of the piston of each of the cylinders 28 and 29).

Assuming now that, under normal operation of the apparatus, the upper faces of anvils 31 and 32 are one eighth inch below the lower surface of overhang 11a of a die carrier such as 11 when such die carrier is indexed or moved to the trimming station as shown in FIG. 1, with the above assumed diameter of one half inch for the piston or lower portions 37a of the rods 37 of each of the pressure intensifiers such as 36, each such rod will have a cross-sectional area of $3.1416 \times \frac{1}{4}^2$ or approximately 0.19635 square inches. Since the area of the upper faces of the pistons in each of the cylinders 18 and 19 is $3.1416 \times 1^2$ or 3.1416 square inches, said piston or lower portions 37a of the rods 37 will have to be actuated downwardly a distance of approximately 2 inches to move said anvil faces the necessary one eighth inch for making contact with the lower or under side or surface of overhang 11a (2 × the area of the cross-section of a rod such as 37 = ⅛ × the area of the upper face of the piston in each of the cylinders 18 and 19, that is, $3.1416 \times \frac{1}{4}^2 \times 2 = 3.1416 \times 1^2 \times \frac{1}{8}$. As pointed out above, the pressure supplied by each of said rods such as 37 must, at least, be approximately 197.82 psi. at such time.

With the foregoing discussion in mind it will be assumed that switch SW (FIG. 1) is actuated to close its contacts a-b and energize solenoid 41b of control valve 41 to initiate a trimming operation such as previously discussed. Such actuation of switch SW causes valve 41 to shift so that the 1000 psi. hydraulic fluid pressure flows from the aforesaid source thereof to conduit CD9 and thence to the upper end of the bore of cylinder 26 to press downwardly against the upper surface of the annular portion 27a of piston 27, while the lower end of the bore of cylinder 26 is connected through conduit CD8 and through valve 41 to the previously mentioned fluid reservoir FR1. Assuming that said upper surface of the annular portion 27a of piston 27 has an area of 10 square inches, such piston is moved or actuated downwardly by a force of 10,000 pounds at such time.

During the above description downward movement of piston 27, the members 28a on arm actuator or member 28 attached to the upper end of piston 27 contact the upper ends of the rods 37 of the pressure intensifiers such as 36 and the pistons or lower portions such as 37a of such rods move further into the small lower portions 36c of the bores 36 of the intensifiers to begin intensification of or intensifying the hydraulic fluid in said lower portions 36c and, when the pressure of such fluid attains the aforementioned pressure of 197.82 psi., the pistons in each of the cylinders 18 and 19, and piston rods 18a and 19a thereof, begin to move downwardly to start the raising of support arms 23 and 24 and, thereby, the apparatus supported thereby. When said pressure exceeds said 197.82 psi. by the previously mentioned 100 to 200 psi. pressure for which pressure relief valves PRV1 and PRV2 are set, such valves are actuated to relieve the excess pressure which then flows through such valves to conduits CD4 and CD5 and thence to fluid reservoir FR. As also previously mentioned, when the pistons such as 37a in the pressure intensifiers move downwardly said 2 inches in their respective bore portions such as 36c, the anvils 31 and 32 contact the lower or under surface of overhang 11a of die carrier 11 to assure or attain horizontal alignment of edges 12a and 17a of mold 12 and trimmer 17, respectively, if such alignment does not already exist. The continued downward actuation of piston 27 and, thereby, of trimmer 17 results in the previously discussed material trimming operation desired. As the pistons in cylinders 18 and 19 move downwardly, a small amount of the hydraulic fluid in the lower ends of such cylinders is displaced and flows to conduit CD1 and thence to hydraulic fluid pressure accumulator FPA where such pressurized hydraulic fluid is stored or accumulated for purposes discussed below.

Following the trimming operation mentioned above, switch SW is again actuated open to interrupt the energizing circuit to solenoid winding 41b of control valve 41 and spring 41a of such valve reactuates it to its condition shown in FIG. 1. This actuation again causes the 1000 psi. fluid pressure to be supplied to the lower end of the bore of cylinder 26 while the upper end of such bore is connected to fluid reservoir FR1. Piston 27 is again actuated upwardly to raise trimmer 17 and terminate the trimming operation. During the upward movement of piston 27, the pressure of the fluid in the lower bore portions 36c of the bores 36 of the intensifiers such as 36 decreases and the pressure of the fluid in the upper ends of the bores of cylinders 18 and 19 correspondingly decreases. When the pressure of such fluid is decreased sufficiently below that of the fluid stored in accumulator FPA, the hydraulic fluid so accumulated or stored flows through conduit CD1 to the lower and upper ends of the bores of cylinders 18 and 19, and, when the pressure of such fluid is insufficient to no longer support the weight of support arms 23 and 24 and its supported apparatus, anvils 31 and 32 are moved out of contact with the overhang of die carrier 11. When the apparatus is again in its positions or conditions shown in FIG. 1, die carrier 11 and die or mold 12 are moved out of the trimming station by the rotation of axle or shaft 16 and a following or succeeding similar die carrier such as 11 and its supported die such as 12 are moved into such station for a trimming operation to be performed on an article in the cavity of such succeeding die.

As previously discussed, when the ends 37d of the rods such as 37 in the pressure intensifiers such as 36 reach their upward positions shown in FIGS. 1 and 4, the pressurized fluid in the lower ends of the bores of the intensifiers flows past the flats 37b on the lower ends of rods 37 to displace some of the fluid in the large upper portions of the bores of the intensifiers and cause such fluid to flow through the small orifices or passages at the upper end of said upper bore portions (FIG. 4) and into the passages such as 36d and thence through conduits CD6 and CD7 to fluid reservoir FR.

It is pointed out that the pressurized hydraulic fluid accumulator FPA is not absolutely essential to the operation of the apparatus disclosed but the use of such an accumulator permits the pistons of cylinders 18 and 19 to be actuated for raising arms 23 and 24 and their supported weight (1400 pounds) at a much lower intensified pressure supplied by the pressure intensifiers to conduits CD2 and CD3 then if the accumulator FPA were not employed. Therefore, if an accumulator such as FPA is not employed, the settings of pressure relief valves PRV1 and PRV2 would, of course, have to be set at much higher pressure relief settings to assure reaching the higher pressure necessary for lifting or raising said apparatus.

Although there is herein shown and described only one form of apparatus embodying the invention disclosed, it is to be understood that such is not to be considered in any way limiting but that various changes can be made therein within the purview of the appended claims without departing from the spirit and scope thereof.

What is claimed is:

1. In an apparatus for trimming thermoplastic material surrounding the bordering edge of an article formed in a die from a sheet of thermoplastic material arranged over said die, such die having an upwardly disposed trimming edge, and such apparatus including first and second upwardly extending support arms supporting at their upper ends a relatively large hydraulic cylinder embodying a piston extending through the ends of such cylinder; a trimmer having a lower cutting edge cooperative with said trimming edge of said die for trimming said thermoplastic material, such trimmer being attached to the lower end of said piston; a die carrier supporting said die below said cylinder; and conduit means for alternately supplying hydraulic fluid at a relatively high pressure to the upper and lower ends of said cylinder for downward and upward actuation of said piston, such downward actuation of such piston moving said trimming and cutting edges into cooperative relationship with each other for trimming said thermoplastic material surrounding said bordering edge of said die; a modification for assuring the horizontal alignment of said cutting and trimming edges with each other prior to said thermoplastic trimming operation, such modification comprising;

I. first and second anvils carried by said first and second support arms respectively and having upper faces disposed in close proximity to the lower surface of an overhang of said die carrier, such anvils being located on opposite sides of said carrier along the diametric centerline thereof;

II. similar first and second relatively small hydraulic cylinders and associated piston rods attached to said first and second support arms respectively for upward actuation thereof and thereby said faces of said anvils into contact with said lower surface of said overhang;

III. means including pressurized fluid conduits for supplying hydraulic fluid at an increasingly intensified pressure to said first and second cylinders to actuate said faces of said anvils upward and into contact with said lower surface of said overhang when said piston of said large hydraulic cylinder is actuated downwardly by said hydraulic fluid supplied to said upper end of such large cylinder; and IV. pressure relief valve means connected to said pressurized fluid conduits for relieving further intensification of the pressure of said intensified hydraulic fluid when such fluid exceeds a preselected intensified pressure above that required for said upward actuation of said faces of said anvils.

2. In an apparatus for trimming thermoplastic material surrounding the bordering edge of an article formed in a die from a sheet of thermoplastic material arranged over said die, such die having an upwardly disposed trimming edge, and such apparatus including; first and second upwardly extending arms supporting at their upper ends a relatively large hydraulic cylinder embodying a piston extending through the ends of such cylinder; a trimmer having a lower cutting edge cooperative with said trimming edge of said die for trimming said thermoplastic material, such trimmer being attached to the lower end of said piston; a die carrier supporting said die below said cylinder; and conduit means for alternately supplying hydraulic fluid at a relatively high pressure to the upper and lower ends of said cylinder for downward and upward actuation of said piston, such downward actuation of such piston moving said trimming and cutting edges into cooperative relationship with each other for trimming said thermoplastic material surrounding said bordering edge of said article; a modification for assuring the horizontal alignment of said cutting and trimming edges with each other prior to said thermoplastic trimming operation, such modification comprising;

I. first and second anvils carried by said first and second support arms respectively and positioned diametrically opposite each other across the diameter of said die carrier and each extending under a lower surface of an overhang of such carrier with the upper faces of the anvils in close proximity to such lower surface;

II. similar first and second relatively small hydraulic cylinders attached to said first and second support arms respectively for upward actuation thereof and thereby said faces of said anvils into contact with said lower surface of said overhang;

III. first and second fluid pressure intensification cylinders attached to opposite sides of said large cylinder with the axial centerlines of the bores of such intensification cylinders parallel with the axial centerline of the bore of said large cylinder, such intensification cylinders being disposed opposite each other across the diameter of the bore of such large cylinder, each such intensification cylinder embodying a rod having an upper elongate portion including an upper end extending snugly and slidably through the upper end of the respective cylinder for physical contact with a rod actuator and a lower elongate portion forming an elongate piston extending snugly and slidably into a relatively elongate small bore portion of the respective cylinder, the lower end of each said elongate piston including passage means for hydraulic fluid flow from said small bore portion of each respective cylinder into the remainder of the bore of such cylinder only when said lower end of the respective elongate piston is adjacent the upper end of the small bore portion of the respective cylinder;

IV. a rod actuator connected to said piston of said large cylinder for contacting the upper ends of said rods of the intensification cylinders and actuating such rods downwardly when such piston of the large cylinder is actuated downwardly;

V. first fluid conduit means connecting a source of hydraulic fluid at a relatively low pressure in multiple to the lower ends of the bores of said first and second small hydraulic cylinders and to the inlet ends of first and second check valves;

VI. second fluid conduit means connecting the outlet end of said first check valve in multiple to the upper end of the bore of said first small cylinder, to the inlet end of a first pressure relief valve and to the lower end of the bore of said first intensification cylinder;

VII. third fluid conduit means connecting the outlet end of said second valve in multiple to the upper end of the bore of said second small cylinder, to the inlet end of a second pressure relief valve and to the lower end of the bore of said second intensification cylinder; and VIII. fourth conduit means connecting the upper ends of the bores of said intensification cylinders and the outlet ends of said pressure relief cylinders to a reservoir for said low pressure hydraulic fluid.

3. The modification in accordance with claim 2 and further including a pressure accumulator connected to said first hydraulic conduit means in a fluid flow relationship therewith.

4. Apparatus for trimming thermoplastic material surrounding the bordering edge of an article formed in a die from a sheet of thermoplastic material arranged over said die, such die having a trimming edge and such apparatus comprising in combination;

I. a die carrier supporting said die and having an annular overhang extending thereabout;

II. a pair of upwardly actuated and upwardly extending support arms;

III. a first hydraulic cylinder embodying a piston extending through the ends of such cylinder, such cylinder being supported by the upper ends of said support arms above said die with the axial centerline of the cylinder and said piston in axial alignment with the center of such die normal thereto;

IV. a trimmer having a lower cutting edge cooperative with said trimming edge of said die for trimming said thermoplastic material and attached to the lower end of said piston with the center of such trimmer in axial alignment with said axial centerline of said cylinder;

V. conduit means for alternately supplying pressurized hydraulic fluid at a relatively high pressure to the upper and lower ends of the bore of said cylinder for downward and upward actuations of said piston respectively, such downward actuation of such piston moving said trimming and cutting edges into cooperative relationship with each other for trimming said thermoplastic material surrounding said bordering edge of said article;

VI. second and third hydraulic cylinders and associated pistons and piston rods attached to each of said support arms for upward actuation thereof, such cylinders and associated pistons and piston rods being similar to each other;

VII. an anvil on each said support arm and extending beneath said overhang of said die carrier with the upper surface of each said anvil in close proximity to the lower surface of such overhang, such anvils being diametrically disposed opposite each other on opposite sides of the overhang;

VIII. similar first and second hydraulic fluid pressure intensifier cylinders attached to each of diametrically opposite sides of said first hydraulic cylinder with the centerline of the bore of each such intensifier cylinder paralleling the centerline of the bore of the first cylinder, approximately the upper half of the bore of each of the intensifier cylinders having a relatively large diameter and the remainder of each such bore having a smaller diameter than said upper half of the respective bore;

IX. a rod embodied in said bore of each said intensifier cylinder with each such rod including a lower portion forming an elongated piston snugly and slidably axially movable in said smaller diameter portion of the bore of the respective intensifier cylinder and providing for fluid flow between such smaller portion of such bore and said upper half thereof only when the lower end of such elongated piston is adjacent the upper end of such smaller diameter bore portion, each such rod also including an upper portion having an upper end extending snugly and slidably through the upper end of the respective intensifier cylinder for physical contact of the top of such upper end by a rod actuator;

X. a rod actuator attached to the upper end of said piston of said first cylinder for contacting said upper ends of said upper portions of said rods and actuating such rods downwardly during downward actuation of such piston; and XI. a relatively low pressure pressurized hydraulic fluid conduit system, such system including;
  A. first hydraulic conduit means connecting a source of relatively low pressure pressurized hydraulic fluid in multiple to a first end of the bore of each of said second and third cylinders and to the inlet side of each of first and second check valves respectively;
  B. second hydraulic conduit means connecting the outlet end of said first check valve in multiple to the second end of the bore of said second cylinder, to the inlet end of a first pressure relief valve and to the lower end of the bore of said first pressure intensifier cylinder;
  C. third hydraulic conduit means connecting the outlet end of said second check valve in multiple to the second end of the bore of said third cylinder, to the inlet end of a second pressure relief valve and to the lower end of the bore of said second pressure intensifier cylinder; and
  D. a plurality of hydraulic conduit means connecting the upper ends of the bores of said pressure intensifier cylinders and the outlet ends of said pressure relief valves to a hydraulic reservoir for said source of relatively low pressure pressurized hydraulic fluid.

5. Apparatus in accordance with claim 4 and further including a pressure accumulator connected to said first hydraulic conduit means in a fluid flow relationship therewith.

* * * * *

UNITED STATES PATENT AND TRADEMARK OFFICE
CERTIFICATE OF CORRECTION

PATENT NO. : 3,979,174
DATED : September 7, 1976
INVENTOR(S) : Thomas F. Hillman
Arthur H. Pienkoski It is certified that error appears in the above-identified patent and that said Letters Patent are hereby corrected as shown below:

Column 5, line 14, after "relief" insert -- valves -- .

Column 6, line 39, change "18" and "19", respectively, to -- 28 -- and -- 29 --, respectively.

Column 7, line 11, change "description" to -- described -- .

Column 10, line 34, after "second", insert -- check -- .

Signed and Sealed this

Eleventh Day of January 1977

[SEAL]

Attest:

RUTH C. MASON
*Attesting Officer*

C. MARSHALL DANN
*Commissioner of Patents and Trademarks*